United States Patent [19]

Kyohzuka et al.

[11] Patent Number: 5,067,373
[45] Date of Patent: Nov. 26, 1991

[54] AUTOMATIC-TRANSMISSION CONTROL SYSTEM

[75] Inventors: Takahiro Kyohzuka; Toshiyuki Kikuchi, both of Hiroshima, Japan

[73] Assignee: Mazda Motor Corporation, Hiroshima-ken, Japan

[21] Appl. No.: 461,282

[22] Filed: Jan. 5, 1990

[30] Foreign Application Priority Data

Jan. 10, 1989 [JP] Japan .................. 1-3251

[51] Int. Cl.⁵ .............................. B60K 41/04
[52] U.S. Cl. .............................. 74/866
[58] Field of Search ............ 74/866; 364/424.1

[56] References Cited

U.S. PATENT DOCUMENTS

| | | | |
|---|---|---|---|
| 4,563,917 | 1/1986 | Higashi et al. | 74/866 |
| 4,569,253 | 2/1986 | Higashi et al. | 74/866 |
| 4,576,065 | 3/1986 | Speranza et al. | 74/866 |
| 4,648,290 | 3/1987 | Dunkley et al. | 74/866 |
| 4,733,580 | 3/1988 | Kubo et al. | 74/866 |
| 4,733,581 | 3/1988 | Hasegawa et al. | 74/866 |
| 4,742,733 | 5/1988 | Schreiner | 74/866 |
| 4,771,386 | 9/1988 | Yasue et al. | 74/866 |
| 4,776,240 | 10/1988 | Miki | 74/866 |
| 4,777,848 | 10/1988 | Taga et al. | 74/866 |
| 4,852,006 | 7/1989 | Speranza | 74/866 |

FOREIGN PATENT DOCUMENTS

| | | | |
|---|---|---|---|
| 0143255 | 7/1985 | Japan | 74/866 |
| 0211154 | 10/1985 | Japan | 74/866 |
| 0161521 | 11/1985 | Japan | 74/866 |
| 0084453 | 4/1986 | Japan | 74/866 |
| 0037558 | 2/1987 | Japan | 74/866 |
| 0147152 | 7/1987 | Japan | 74/866 |

*Primary Examiner*—Leslie A. Braun
*Assistant Examiner*—Daniel Wittels
*Attorney, Agent, or Firm*—Sixbey, Friedman, Leedom & Ferguson

[57] ABSTRACT

An automatic-transmission control system causes the automatic transmission to shift once to an intermediate gear speed and then shift to the final gear speed when a jump shifting is required. The automatic transmission control system causes the automatic transmission to directly upshift to the final gear speed without once shifting to an intermediate gear speed when a jump upshift is required while the engine load is not heavier than a predetermined value or the vehicle speed is not lower than a predetermined value.

9 Claims, 3 Drawing Sheets

AUTOMATIC-TRANSMISSION CONTROL SYSTEM

BACKGROUND OF THE INVENTION

1. Field of the Invention

This invention relates to an automatic-transmission control system.

2. Description of the Prior Art

There have been known various automatic-transmission control systems which electronically control the gear-shifting operation of an automatic transmission by the use of a microcomputer. For example, the automatic-transmission control system disclosed in Japanese Unexamined Patent Publication No. 62-93552 causes the automatic transmission, when a jump shifting from a certain gear speed to a gear speed which is higher or lower than the gear speed by two or more stages is required, to shift once to an intermediate gear speed and then shift to the final gear speed in order to suppress shift shock.

Generally a jump shifting is required when the throttle opening is abruptly reduced in a state in which the engine load has been heavy and the throttle has been wide opened, and usually the jump shifting is 1-3 upshift or 2-4 upshift. If the automatic transmission directly shifts to the highest gear speed, the gear ratio changes largely and the engine speed abruptly lowers, which gives rise to a shift shock. In order to avoid such a shift shock, the aforesaid automatic-transmission control system causes the automatic transmission to shift once to an intermediate gear speed and then shift to the highest gear speed when a jump shifting is required. When the engine load is heavier than a predetermined value, the automatic transmission control system allows the automatic transmission to directly shift to the highest gear speed.

However the automatic-transmission control system, which controls the automatic transmission in the manner described above when the jump shifting is required, is disadvantageous in that, since the automatic transmission shifts directly to the highest gear speed when the engine load is very heavy, friction coupling elements in the automatic transmission are subjected to heavy load and the durability of the automatic transmission lowers, and in that, since the automatic transmission once shifts to an intermediate gear speed when the engine load is relatively light, driver's power requirement cannot be satisfied.

For example, when the accelerator pedal is released and the gear speed determined on the basis of the shift pattern becomes third or fourth in a state where the engine load has been very heavy and the engine output power has been maximized with the automatic transmission in first or second, heavy load transitionally acts on the friction coupling elements to produce wear and heat in the case the engine load at that time is still heavy, thereby promoting deterioration of the durability. On the other hand, when the automatic transmission is caused to shift to an intermediate gear speed before shifting to the final gear speed in order to reduce the load which acts on the friction coupling elements, driver's power requirement cannot be well satisfied since the gear speed which conforms to the requirement is the final gear speed.

Further, when the automatic transmission shifts to the intermediate gear speed with the vehicle speed higher than a predetermined value, the engine speed will become excessively high, which adversely affects the durability of the engine.

SUMMARY OF THE INVENTION

In view of the foregoing observations and description, the primary object of the present invention is to provide an automatic-transmission control system which is of such a type as causes the automatic transmission to shift once to an intermediate gear speed and then shift to the final gear speed when a jump shifting is required, and which is free from the aforesaid drawbacks inherent to the conventional automatic transmission control system of this type.

In accordance with one aspect of the present invention, the automatic transmission control system causes the automatic transmission to directly upshift to the final gear speed without once shifting to an intermediate gear speed when an upshift to a gear speed which is higher than the present gear speed by two or more stages is required while the engine load is not heavier than a predetermined value.

In accordance with another aspect of the present invention, the automatic-transmission control system causes the automatic transmission to directly upshift to the final gear speed without once shifting to an intermediate gear speed when an upshift to a gear speed which is higher than the present gear speed by two or more stages is required while the vehicle speed is not lower than a predetermined value.

In accordance with still another aspect of the present invention, the automatic-transmission control system causes the automatic transmission to directly upshift to the final gear speed without once shifting to an intermediate gear speed when an upshift to a gear speed which is higher than the present gear speed by two or more stages is required while the engine load is not heavier than a predetermined value or the vehicle speed is not lower than a predetermined value.

DESCRIPTION OF THE PREFERRED EMBODIMENT

Figure 1:
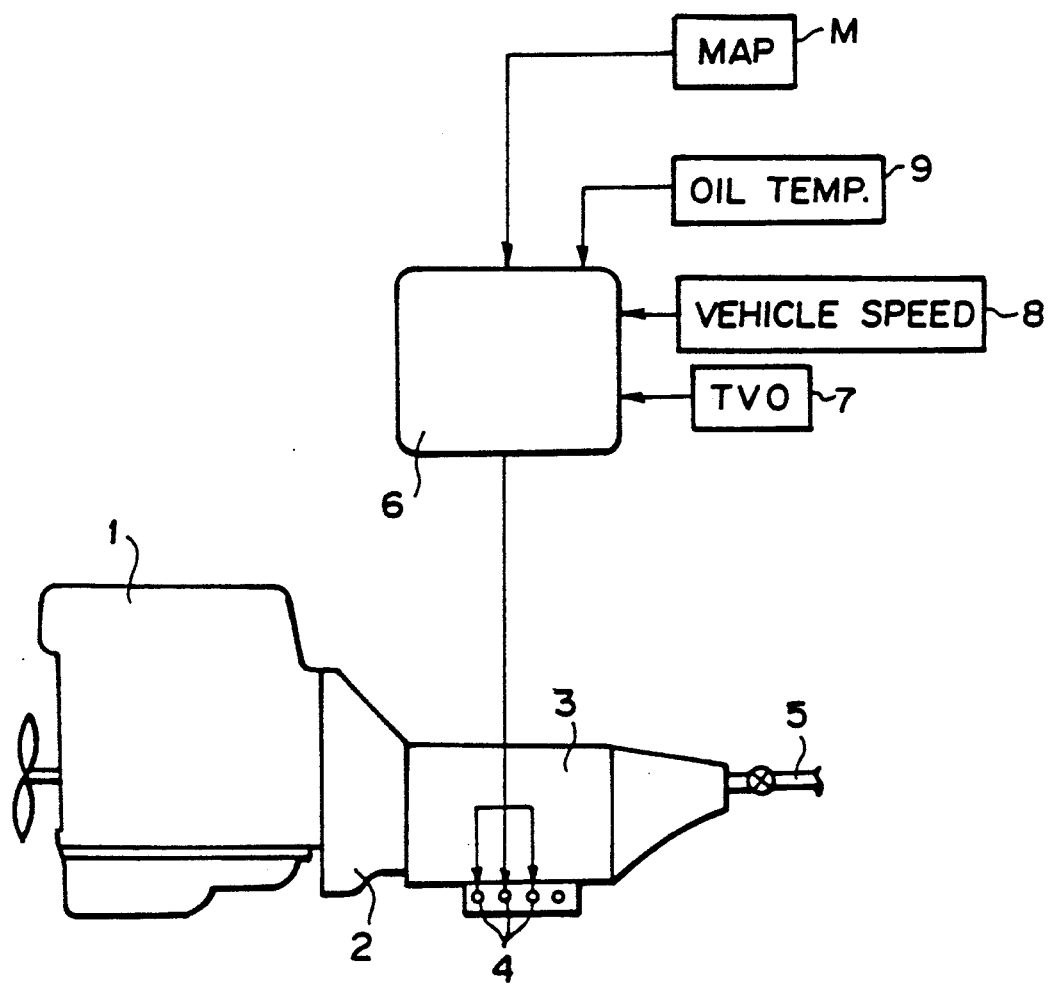
FIG. 1 is a schematic view showing an automatic transmission provided with an automatic-transmission control system in accordance with an embodiment of the present invention.

In FIG. 1, the output of an engine 1 is input into an automatic transmission 3 by way of a torque convertor 3 and then output to a propeller shaft 5. An automatic-transmission control system controls solenoid valves 4 in the automatic transmission 3 and causes the automatic transmission 3 to shift. The structure and the operation of the automatic transmission 3 are well known in the art and will not be described here.

A control unit 6 outputs a control signal to the solenoid valves 4 and controls the solenoid valves so that the automatic transmission 3 shifts to a desired gear speed according to the running condition of the vehicle represented by the vehicle speed, the throttle opening and the like. The control unit 6 may be of a one-chip microcomputer. Various signals necessary for the gear shifting control such as a throttle opening signal from a throttle position sensor 7, a vehicle speed signal from a vehicle speed sensor 8, an oil temperature signal from an oil temperature sensor 9 and the like are input into the control unit 6 from sensors disposed in various positions.

Figure 3:
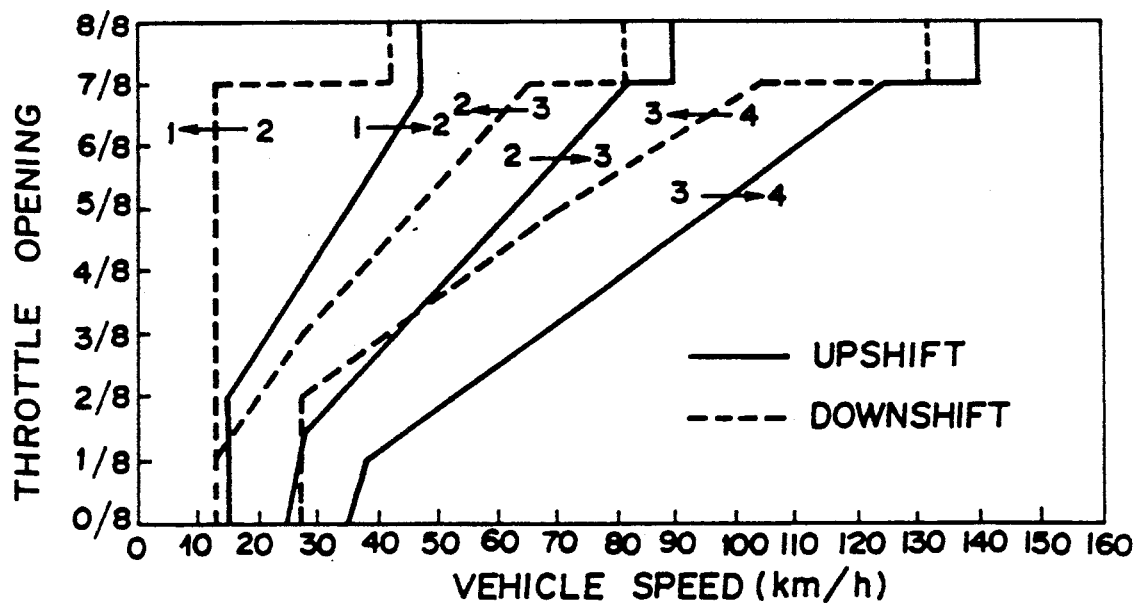
FIG. 3 shows an example of a gear-shifting map.

The control unit 6 controls the automatic transmission according to these detecting signals. That is, the control unit 6 determines the gear speed to which the automatic transmission 3 is to shift according to the engine load (the throttle opening) and the vehicle speed with reference to the gear-shifting map shown in FIG. 3, and causes the solenoid valves 4 to shift the automatic transmission 3 to the gear speed thus determined. If the gear speed thus determined (will be referred to as "the target gear speed", hereinbelow) is higher than the present gear speed by two or more stages, that is, if a jump upshift is required, the control unit 6 causes the automatic transmission 3 to shift to an intermediate gear speed between the present gear speed and the target gear speed and then shift to the target gear speed. Basically, the control unit 6 causes the automatic transmission 3 to be in the intermediate gear speed for a time which is determined according to the throttle opening and the oil temperature. However, if the jump upshift is required when the engine load represented by the throttle opening is not heavier than a predetermined value, the control unit 6 causes the automatic transmission to directly shift to the target gear speed without once shifting to an intermediate gear speed. Further if the automatic transmission 3 is required to upshift from first to third (1-3 upshift) when the vehicle speed is not lower than a predetermined value the control unit 6 causes the automatic transmission to directly shift to third without once shifting to second.

Figure 2:
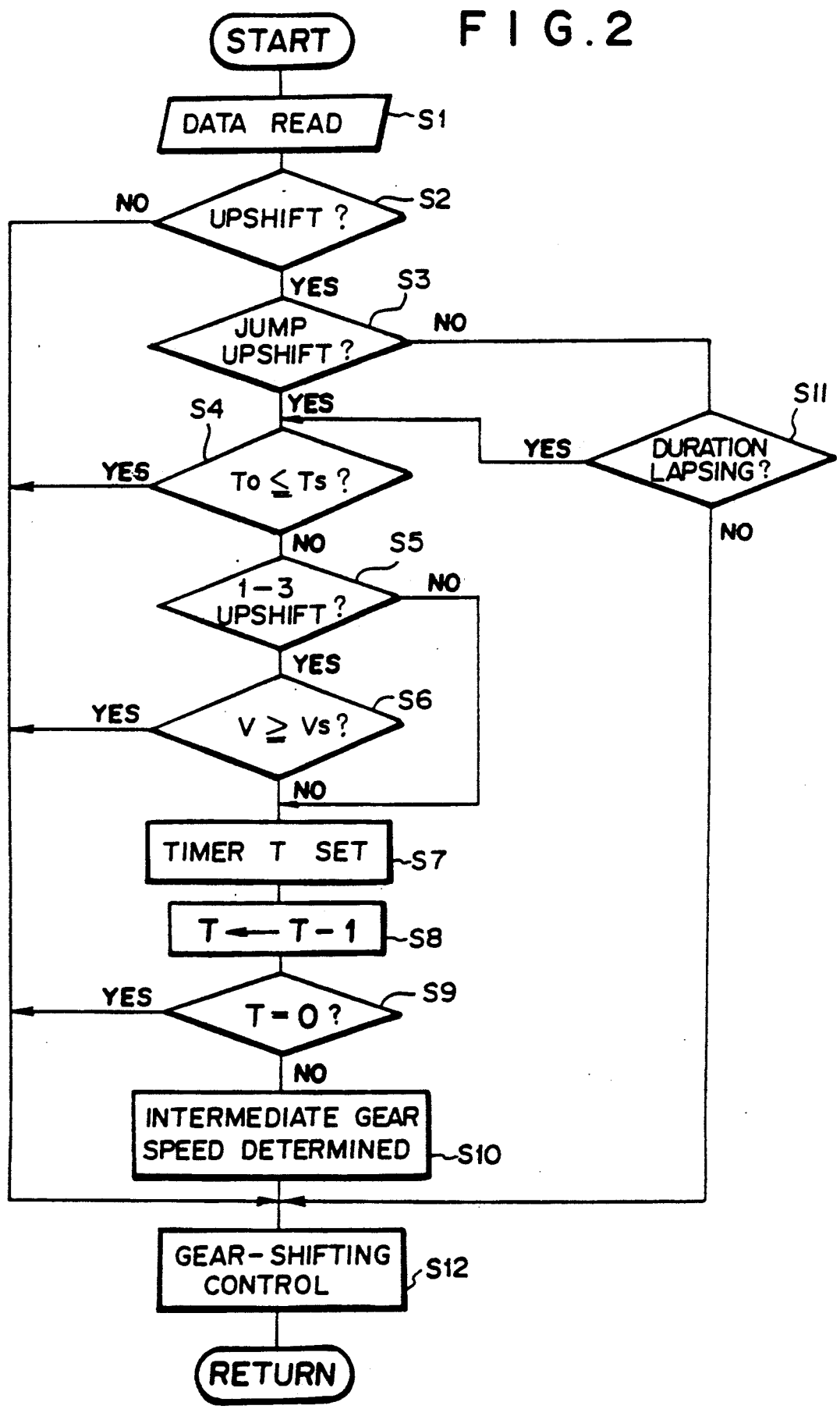
FIG. 2 is a flow chart for illustrating the operation of the control unit.

The operation of the control unit 6 will be described with reference to the flow chart shown in FIG. 2. This flow chart shows only a part of the operation of the control unit 6 concerning to the jump upshift. The control unit 6 reads the signals from the various sensors such as the throttle opening signal, the vehicle speed signal and the oil temperature signal, and determines the target gear speed according to the vehicle speed and the throttle opening with reference to the gear-shifting map shown in FIG. 3. (step S1) Then the control unit 6 compares the target gear speed with the present gear speed and determines whether an upshift is required. (step S2) When it is determined in step S2 that an upshift is required, the control unit 6 determines in step S3 whether the upshift required is a jump upshift.

When it is determined in step S3 that the jump upshift is required, the control unit 6 determines in step S4 whether the throttle opening To is not larger than a preset value Ts. When it is determined that the throttle opening To is not larger than the preset value Ts, i.e., that the engine load is not heavier than a preset value, the control unit 6 causes the automatic transmission 3 to directly upshift to the target gear speed. (step S12)

When it is determined in step S4 that the throttle opening To is larger than the preset value Ts, the control unit 6 determines in step S5 whether the upshift required is 1-3 upshift. When it is determined that the upshift required is 1-3 upshift, the control unit 6 determines in step S6 whether the vehicle speed V is not lower than a preset speed Vs. When it is determined that the vehicle speed V is not lower than the preset speed Vs, the control unit 6 causes the automatic transmission 3 to directly upshift to the target gear speed. (step S12)

When it is determined in step S5 that the upshift required is a jump upshift other than 1-3 upshift or when it is determined in step S6 that the vehicle speed V is lower than the preset speed Vs though the upshift required is 1-3 upshift, the control unit 6 proceeds to step S7, where it determines the value T of a timer, which sets the duration of the intermediate gear speed for which the automatic transmission 3 is to be in the intermediate gear speed, according to the oil temperature and the throttle opening and sets the timer.

Figure 4:
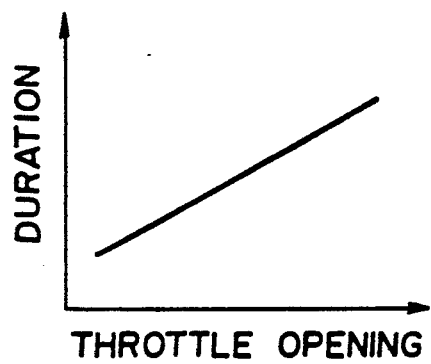
FIG. 4 is a graph showing an example of the relation between the time for which the automatic transmission is to be in the intermediate gear speed and the throttle opening.
Figure 5:
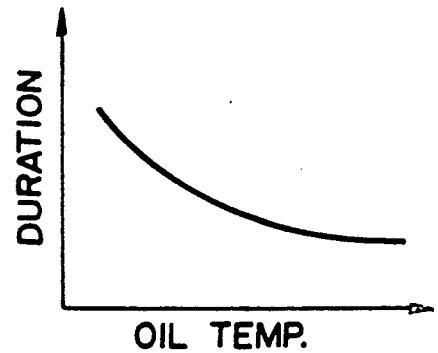
FIG. 5 is a graph showing an example of the relation between the time for which the automatic transmission is to be in the intermediate gear speed and the oil temperature.

Since the load acting on the automatic transmission increases as the throttle opening or the engine load increases, the duration of the intermediate gear speed is set so that it increases as the throttle opening increases as shown in FIG. 4. Further the duration of the intermediate gear speed is set so that it increases as the oil temperature lowers and the viscosity of the oil increases as shown in FIG. 5.

After the value T of the timer is thus set, the control unit 6 determines the intermediate gear speed to which the automatic transmission 3 is to shift and holds the automatic transmission 3 in the intermediate gear speed until the duration lapses. (steps S8 to S12)

As can be understood from the description above, in the automatic-transmission control system of this embodiment, when a jump upshift is required, the automatic transmission is caused to once shift to an intermediate gear speed and held there for a time which is set according to the throttle opening and the oil temperature, the load acting on the friction coupling elements of the automatic transmission is reduced and at the same time, the shift shock is suppressed. However, when the throttle opening is small and the load on the friction coupling elements is light, the automatic transmission is caused to directly shift to the final gear speed without once shifting to an intermediate gear speed, whereby driver's power requirement can be satisfied. Further, when the upshift required is 1-3 upshift with the vehicle speed higher than a predetermined value and the engine speed will become excessively high if the automatic transmission once shifts to second, the automatic transmission is caused to directly shift to the final gear speed without once shifting to an intermediate gear speed, whereby the engine is protected.

Though, in the embodiment described above, the automatic transmission is prevented from shifting to an intermediate gear speed only when 1-3 upshift is required at a high engine speed as for prevention of over-revolution of the engine, this control may also be effected for jump upshifts other than 1-3 upshift if there is a possibility that the engine speed becomes excessively high when the automatic transmission to the intermediate gear speed. Further, though, in the embodiment described above, the automatic transmission is prevented from shifting to an intermediate gear speed according to both the engine load and the vehicle speed, the automatic transmission may be prevented from shifting to an intermediate gear speed according to only one of the engine load and the vehicle speed. Further, though in the embodiment described above, the time for which the automatic transmission is held in the intermediate gear speed is changed according to the oil temperature and the throttle opening, the time may be fixed irrespective of such factors.

It is preferred that, if the shift shock becomes serious when the automatic transmission is prevented from shifting to an intermediate gear speed, the shift shock be suppressed, for instance, by adjusting the engaging speed of the friction coupling elements.

We claim:

1. An automatic control system for controlling a gear speed to be shifted according to a gear shifting pattern in which the gear speed to be shifted is determined according to at least engine load and vehicle speed conditions, said automatic-transmission control system comprising:
    a gear-shifting limiting means for causing an automatic transmission, when a jump upshift from a certain gear speed to a final gear speed higher than the certain gear speed by two or more stage is required, to shift to an intermediate gear speed for a predetermined time interval and then shift to the final gear speed irrespective of controlling by said gear shift pattern; and
    a limit release means for allowing the automatic transmission to directly upshift to the final gear speed without once shifting to the intermediate gear speed when the jump upshift is required while the engine load is not heavier than a predetermined value.

2. An automatic-transmission control system as defined in claim 1 in which said limit release means allows the automatic transmission to directly upshift to the final gear speed without once shifting to the intermediate gear speed when the Jump upshift is required while the engine load is not heavier than a predetermined value or the vehicle speed is not lower than a predetermined value.

3. An automatic-transmission control system as defined in claim 1 in which said predetermined time interval, when the automatic transmission is held in the intermediate gear speed, is changed according to the throttle opening.

4. An automatic-transmission control system as defined in claim 1 in which said predetermined time interval, when the automatic transmission is held in the intermediate gear speed, is changed according to the oil temperature.

5. An automatic-transmission control system as defined in claim 1 in which said predetermined time interval, when the automatic transmission is held in the intermediate gear speed, is changed according to both the throttle opening and the oil temperature.

6. An automatic-transmission control system for controlling a gear speed to be shifted according to a gear shifting pattern in which the gear speed to be shifted is determined according to at least engine load and vehicle speed conditions, said automatic-transmission control system comprising:
    a gear-shifting limiting means for allowing an automatic transmission, when a jump upshift from a certain gear speed to a final gear speed higher than the certain gear speed by two or more stages is required, to shift to an intermediate gear speed for a predetermined time interval and then shift to the final gear speed irrespective of controlling by said gear shift pattern; and
    a limit release means for allowing the automatic transmission to directly upshift to the final gear speed without once shifting to the intermediate gear speed when the jump upshift is required while the vehicle speed is not lower than a predetermined value.

7. An automatic-transmission control system as defined in claim 6 in which said predetermined time interval, when the automatic transmission is held in the intermediate gear speed, is changed according to the throttle opening.

8. An automatic-transmission control system as defined in claim 6 in which said predetermined time interval, when the automatic transmission is held in the intermediate gear speed for a time which is changed according to the oil temperature.

9. An automatic-transmission control system as defined in claim 6 in which said predetermined time interval, when the automatic transmission is held in the intermediate gear speed, is changed according to both the throttle opening and the oil temperature.

* * * * *